United States Patent
Moran et al.

[15] 3,653,556
[45] Apr. 4, 1972

[54] LIQUID DISPENSING APPARATUS

[72] Inventors: John J. Moran; Robert C. Querry, both of Houston, Tex.

[73] Assignee: Hycel, Inc., Houston, Tex.

[22] Filed: Jan. 5, 1970

[21] Appl. No.: 700

[52] U.S. Cl..........................222/309, 222/321, 222/385, 222/530
[51] Int. Cl..........................................G01f 11/06
[58] Field of Search..................222/385, 321, 309, 527, 530; 23/259, 292

[56] References Cited

UNITED STATES PATENTS

| | | | |
|---|---|---|---|
| 3,556,353 | 1/1971 | Echols | 222/321 X |
| 1,632,218 | 6/1927 | Chaffin et al. | 222/385 |
| 3,323,689 | 6/1967 | Elmore | 222/385 |

*Primary Examiner*—Robert B. Reeves
*Assistant Examiner*—John P. Shannon, Jr.
*Attorney*—James F. Weiler, Jefferson D. Giller, William A. Stout, Paul L. DeVerter, II, Dudley R. Dobie, Jr. and Henry W. Hope

[57] ABSTRACT

A manually operated liquid dispensing apparatus for use in dispensing chemical reagents and corrosive liquids from a container. A glass plunger having a ground glass piston slidable in a glass cylinder and a flat ground glass check valve in the lower end of each of the cylinder and plunger whereby corrosive liquids can be admitted into the cylinder and discharged through the plunger. The plunger having calibration means and an adjustable stop for dispensing a measured amount of liquid therefrom. A flexible outlet hose connected to the plunger outlet and a hose support adapted to be connected to the apparatus and including a hose holding means and also including means for closing the end of the hose for eliminating drippage and evaporation.

2 Claims, 5 Drawing Figures

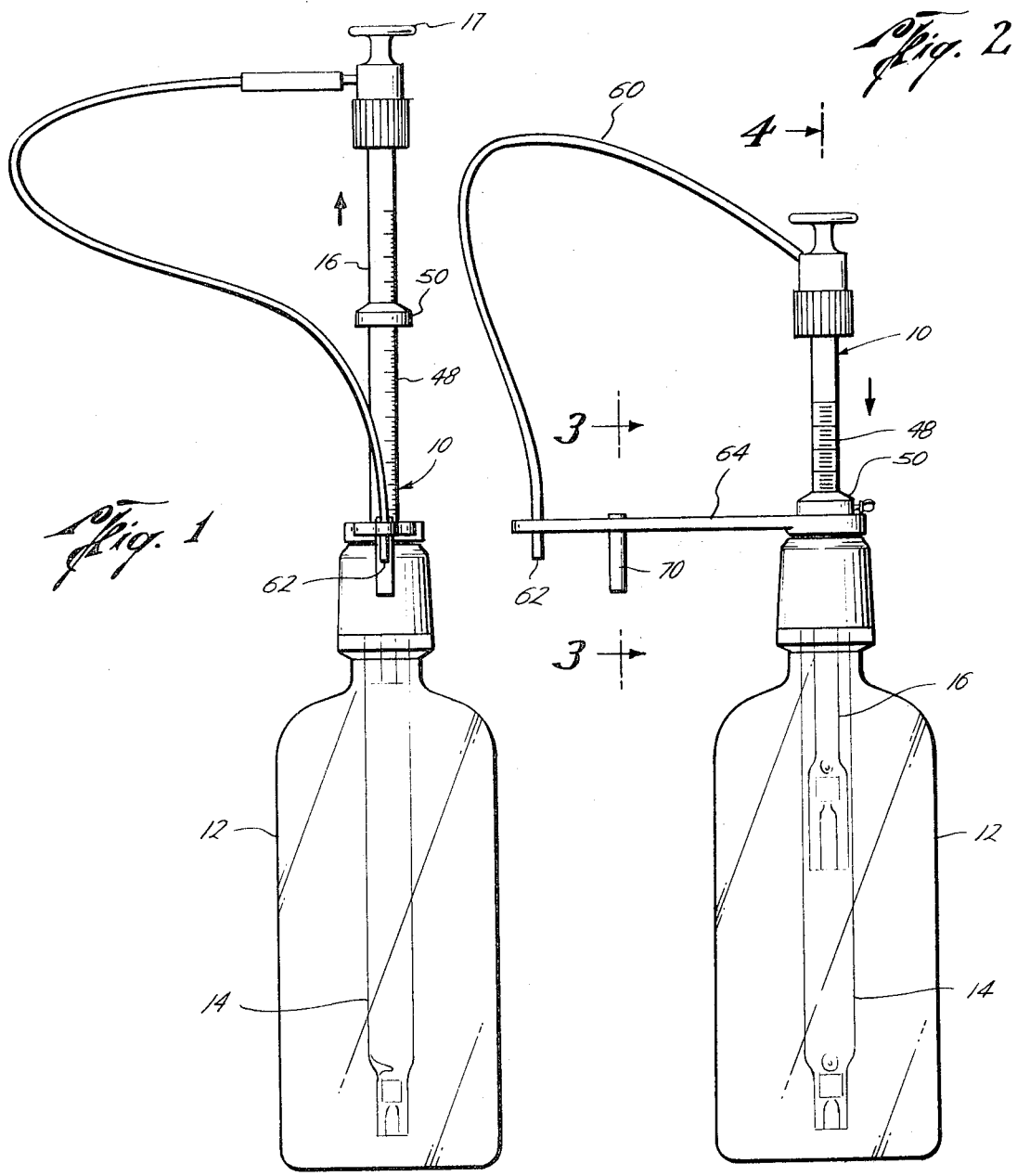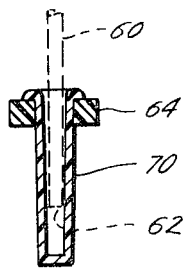

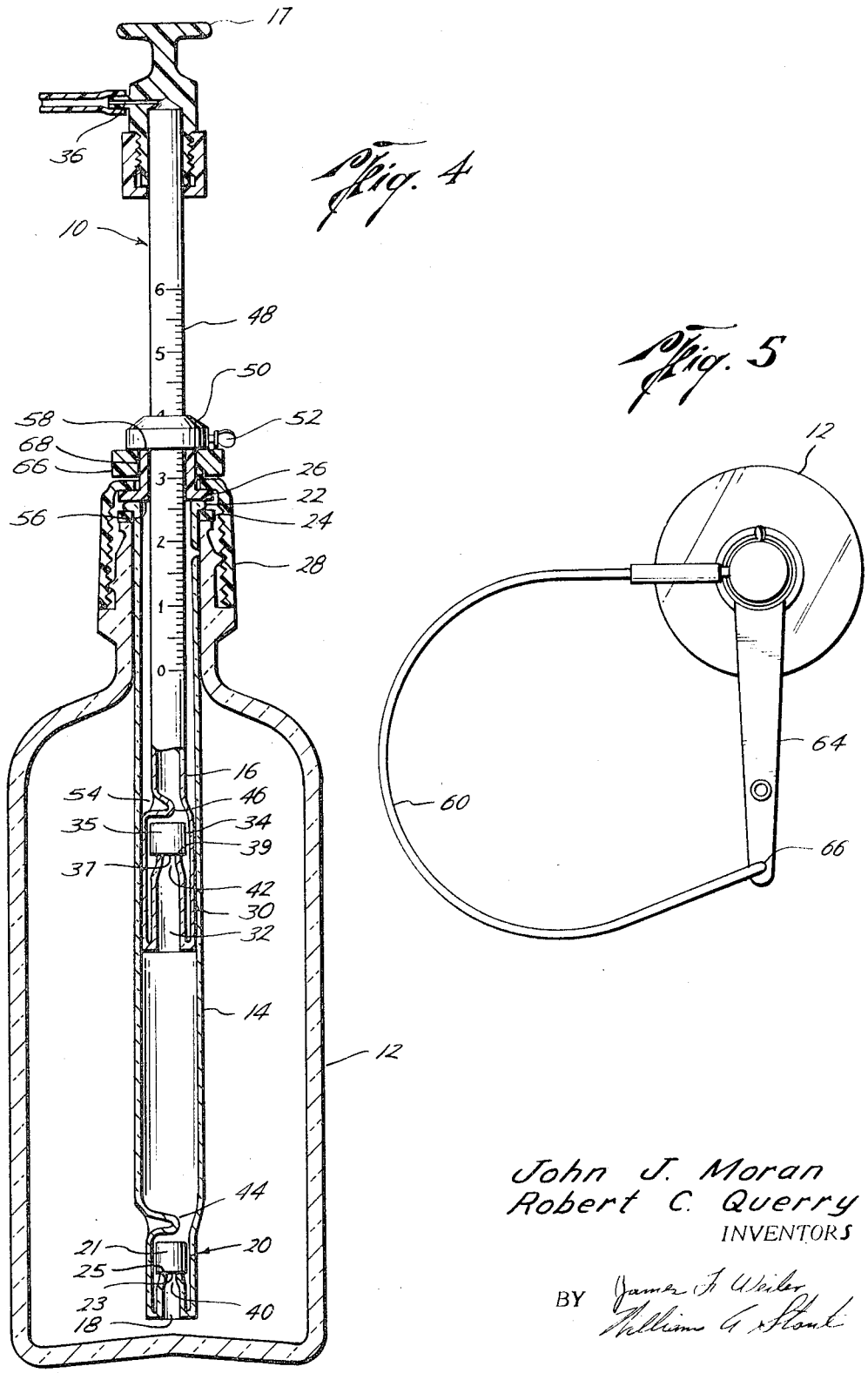

LIQUID DISPENSING APPARATUS

BACKGROUND OF THE INVENTION

Generally, manually operated calibrated liquid dispensing apparatuses such as shown in U.S. Pat. No. 3,143,252 are old. The present invention is directed to an improved liquid dispensing apparatus which is resistant to corrosive materials, and which the coacting sealing surfaces are ground glass to provide a positive and tighter seal against fluid leakage and provide a more accurate measurement of the dispensed liquid. A dispensing and support structure allows ease of dispensing and when not in use protects the working area from undesirable drainage and eliminates evaporation from the dispenser.

SUMMARY

One feature of the present invention is the provision of a manually actuated liquid dispensing apparatus in which a glass plunger having a ground glass piston is slidable into a cylinder and wherein a check valve is provided in the lower end of each of the cylinder and the plunger with each check valve including a flat ground glass seating surface and a flat ground glass valve element with the inlet into the valve being a capillary tube to provide a large seating surface to provide a positive and tighter valve seat.

A further object of the present invention is the provision of an adjustable calibration stop surrounding the plunger and adapted to contact the top of the container in which the apparatus is supported to limit the extent of travel of the plunger for dispensing measured amounts of fluid.

Yet a still further object is the provision of a flexible outlet hose connected to the plunger outlet and a hose support adapted to be connected to the apparatus including an adjustable hose holding means and further including a drip cup on the support for closing the end of the hose for eliminating drippage and evaporation from the hose when not in use.

BRIEF DESCRIPTION OF THE DRAWINGS

FIG. 1 is an elevational view of the liquid dispensing apparatus of the present invention with the dispensing plunger in an upward position, FIG. 2 is a side elevational view of the apparatus of FIG. 1 with the dispensing plunger in a down position, FIG. 3 is an enlarged cross-sectional view taken along the line 3—3 of FIG. 2, FIG. 4 is an enlarged cross-sectional view taken along the line 4—4 of FIG. 2, and FIG. 5 is a top view of the apparatus of FIG. 1.

DESCRIPTION OF THE PREFERRED EMBODIMENT

Referring now to the drawings, and particularly to FIGS. 1, 2 and 3, the reference numeral 10 generally indicates the liquid dispensing apparatus of the present invention and is here shown inserted in and supported in a container such as a chemical reagent bottle 12 for dispensing measured amounts of the chemical reagents therefrom.

The liquid dispensing apparatus 10 generally includes a cylinder 14 and a dispensing plunger 16 which is reciprocally slidable in the cylinder 14. Preferably, the cylinder 14 is made of glass for resisting corrosive fluids and includes an inlet 18 adjacent the bottom thereof for admitting fluid from the bottle 12 through a check valve, generally indicated by the numeral 20 and into the cylinder 14 as the plunger 16 is raised in the cylinder 14. The cylinder 14 also includes a flange 22 which is adapted to be supported by the container 12 between gaskets 24 and 26 and held in place by a top 28 which is secured to the top of the container 12, such as by threads.

The plunger 16 is also preferably made of glass and, as best seen in FIG. 4, includes a ground glass piston 30 for slidably engaging the interior of the cylinder 14 to provide a precise sealing surface which prevents fluid leakage around the piston thereby insuring accurate dispensing of the liquid and at the same time resisting the effects of corrosive liquids on the piston 30. The plunger 16 includes an inlet 32 in the bottom thereof, a check valve generally indicated by the numeral 34, an outlet 36 at the top of the plunger 16 through which the dispensed liquid will flow on downward movement of the plunger in the cylinder 14 and an actuating knob 17 for manually reciprocating the plunger.

The check valves 20 and 34 are identical and include glass valve elements 21 and 35, respectively, which have a flat ground glass sealing surface 23 and 37, respectively. The seating surfaces also include flat ground glass seating surfaces 25 and 39, respectively, which coact with the valve element sealing surfaces 23 and 37, respectively. In addition the liquid inlets 18 and 32 include capillary sections 40 and 42, respectively, thereby providing a larger valve seating surface. Thus, the check valves 20 and 34 are of glass to resist corrosive liquids, and the particular valve structure provides a positive and tighter seal against leakage to again insure an accurate amount of liquid is dispensed. Indentations 44 and 46 are provided above the valve elements 21 and 35, respectively, to insure that they are held adjacent the valve seats in order to be quick acting.

In order to provide a measured amount of dispensed liquid, calibration lines 48 are placed on the plunger 16 and an adjustable calibration stop 50 is provided which is slidable on the plunger 16 and secured in place by a thumb screw 52. Upward movement of the plunger 16 is limited by a shoulder 54 on the plunger 16 above the piston 30 which contacts a stop shoulder 56 and downward movement of the plunger 16 into the cylinder 14 is controlled by the placement of the adjustable calibration stop 50 which contacts shoulder 58. Thus, by adjusting the position of the stop 50 on the plunger 16 to the desired location, the amount of dispensed liquid can be accurately controlled.

A flexible dispensing line 60 may be provided connected to the outlet 36 from the plunger 16 with the advantage that the end 62 of the line 60 may be conveniently led to the desired location. In addition, a hose support 64 is provided and adapted to be connected to the apparatus 10 and supported thereby such as by opening 68 surrounding the upper portion of gasket 26. In turn, the support 64 includes suitable means for supporting the flexible dispensing hose 60 such as an opening 66 into which the end 62 of the hose 60 is slidable but frictionally held whereby the end 62 may be suitably positioned and held in place. In addition, as best seen in FIGS. 2, 3 and 5, the support 64 may include means for closing the end 62 of the hose 60 when the liquid dispensing apparatus 10 is not in use. The closing means may include a drip cup 70 which thereby prevents leakage of any corrosive liquid to the surrounding environment, and also prevents evaporation of the liquid from the apparatus 10.

In use, liquid is dispensed from the container 12 by actuation of the plunger 16 by operation of the actuating knob 17. Upward movement of the plunger 16 draws in liquid from the container 12 through the inlets 18 and check valve 20 into the interior of the cylinder 14 by suction. Upward movement of the plunger 16 is limited by the contact of the plunger shoulder 54 with the stop shoulder 56. Downward movement of the plunger 16 then forces the liquid from the cylinder 14 into the plunger inlet 32 and through the check valve 34 and into the upper portion of the interior of the plunger 16 and out the outlet 36 and the flexible dispensing line 60. It is to be noted that as the plunger 16 is raised, the check valve 34 is positively closed and that as the plunger 16 is depressed the check valve 20 is positively forced into a closed position.

The flexible hose 60 may be inserted in the support opening 66 and slidably positioned therein as desired or may be withdrawn from the opening 66 and directly inserted into the location or container into which the fluid is to be dispensed. When not in use, the free end 62 of the flexible dispensing hose 60 may be inserted in the drip cup 70 for protecting the environment against the dispensed liquid and also for preventing evaporation of liquid from the apparatus 10.

The present invention, therefore, is well adapted to carry out the objects and attain the ends and advantages mentioned as well as others inherent therein.

What is claimed is:

1. A liquid dispensing apparatus for dispensing liquid from a container comprising, a glass cylinder adapted to be supported in the container, a glass plunger having a ground glass piston slidable in the cylinder and including an outlet adjacent the plunger top, a check valve in the lower end of each of the cylinder and plunger, each check valve including a flat ground glass seating surface and a flat ground glass valve element with the inlet into the valve including a capillary tube to provide a large seating surface, an adjustable calibration stop surrounding the plunger and adapted to contact the top of the container thereby limiting the travel of the plunger into the cylinder for dispensing measured amounts of fluid, calibration means on the plunger indicating the amount of liquid being dispensed by actuation of the plunger to its extents of travel, a flexible outlet hose connected to the plunger outlet, a hose support adapted to be connected to the apparatus, said support including hose holding means, and means on the support for closing the end of the hose for eliminating drippage and evaporation.

2. The apparatus of claim 1 wherein the hose holding means includes an opening through which the flexible hose is slidable but frictionally held, and the closing means includes a drip cup for receiving the end of the hose.

* * * * *